United States Patent
Xin et al.

(10) Patent No.: US 11,080,943 B2
(45) Date of Patent: Aug. 3, 2021

(54) METHOD AND APPARATUS FOR DISPLAYING WITH 3D PARALLAX EFFECT

(71) Applicant: HUAWEI TECHNOLOGIES CO., LTD., Guangdong (CN)

(72) Inventors: Xin Xin, Shanghai (CN); Yu Gao, Shanghai (CN); Jun Chen, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/852,042

(22) Filed: Apr. 17, 2020

(65) Prior Publication Data

US 2020/0242850 A1    Jul. 30, 2020

Related U.S. Application Data

(63) Continuation of application No. PCT/CN2018/093924, filed on Jun. 30, 2018.

(30) Foreign Application Priority Data

Oct. 20, 2017 (CN) .......................... 201710986563.6

(51) Int. Cl.
*G06T 19/00* (2011.01)
*G06T 19/20* (2011.01)
*G06F 3/01* (2006.01)

(52) U.S. Cl.
CPC .............. *G06T 19/20* (2013.01); *G06F 3/011* (2013.01); *G06T 2200/24* (2013.01); *G06T 2219/2016* (2013.01)

(58) Field of Classification Search
CPC .. H04N 13/332; H04N 13/275; H04N 13/398; H04N 13/128; H04N 13/122; G06T 19/00; G06F 3/0481; G06F 3/01
See application file for complete search history.

(56) References Cited

U.S. PATENT DOCUMENTS

| | | |
|---|---|---|
| 2012/0033052 A1 | 2/2012 | Shintani |
| 2014/0198101 A1 | 7/2014 | Vilkin et al. |

(Continued)

FOREIGN PATENT DOCUMENTS

| | | |
|---|---|---|
| CN | 102385438 A | 3/2012 |
| CN | 103929634 A | 7/2014 |

(Continued)

*Primary Examiner* — Martin Mushambo
(74) *Attorney, Agent, or Firm* — Womble Bond Dickinson (US) LLP

(57) ABSTRACT

Embodiments of the present invention relate to the field of communications technologies, and disclose a method and an apparatus for displaying with a 3D parallax effect, to generate a relatively good 3D parallax effect. A specific solution is: displaying a graphical user interface, where the graphical user interface includes first content, and the first content includes at least two elements; obtaining a first operation instruction which is used for moving, in an area for displaying the first content, at least one first element of the at least two elements; and moving each of the at least one first element by a different distance along a direction of a first straight line, so that the first content has a 3D parallax effect, where the direction of the first straight line is a direction having a preset included angle with a plane in which the graphical user interface is located.

20 Claims, 10 Drawing Sheets

(56) References Cited

U.S. PATENT DOCUMENTS

| | | |
|---|---|---|
| 2015/0009305 A1 | 1/2015 | Suh et al. |
| 2015/0312559 A1* | 10/2015 | Ueno .................. H04N 13/275 348/53 |
| 2016/0012631 A1* | 1/2016 | Kim ........................ G06F 3/011 345/419 |
| 2016/0162155 A1 | 6/2016 | Noda et al. |

FOREIGN PATENT DOCUMENTS

| | | |
|---|---|---|
| CN | 104065950 A | 9/2014 |
| CN | 104685869 A | 6/2015 |
| CN | 104883556 A | 9/2015 |
| CN | 104898843 A | 9/2015 |
| CN | 105635716 A | 6/2016 |
| CN | 105872518 A | 8/2016 |
| CN | 106200942 A | 12/2016 |
| CN | 106664398 A | 5/2017 |
| CN | 107835403 A | 3/2018 |
| EP | 0905988 A1 | 3/1999 |
| WO | 2011059270 A2 | 5/2011 |
| WO | 2017031246 A1 | 2/2017 |
| WO | 2017139667 A1 | 8/2017 |
| WO | 2017169158 A1 | 10/2017 |

* cited by examiner

METHOD AND APPARATUS FOR DISPLAYING WITH 3D PARALLAX EFFECT

CROSS-REFERENCE TO RELATED APPLICATIONS

This application is a continuation of International Application No. PCT/CN2018/093924, filed on Jun. 30, 2018, which claims priority to Chinese Patent 201710986563.6, filed on Oct. 20, 2017. The disclosures of the aforementioned applications are hereby incorporated by reference in their entireties.

TECHNICAL FIELD

Embodiments of the present invention relate the field of communications technologies, and in particular, to a method and an apparatus for displaying with a three-dimensional (3D) parallax effect.

BACKGROUND

A virtual reality (VR) technology is a technology for a computer emulation system in which a virtual world may be created and experienced. A virtual information environment may be created in multi-dimensional information space by using the VR technology, to provide a user with an immersive feeling that the user is personally on the scene.

According to the VR technology, a manner of a plurality of elements in cooperation with a mask may be used, to place the plurality of elements at preset locations in space, so that a 3D effect is generated due to distances between the plurality of elements. During actual application, the user may use a VR device to view content having a 3D effect. The content having the 3D effect includes a plurality of elements, and the plurality of elements currently used are all 2D elements.

However, because the plurality of elements used are all 2D elements, a 3D effect generated is relatively poor when the plurality of 2D elements are placed at preset locations in space.

SUMMARY

Embodiments of the present invention provide a method and an apparatus for displaying with a 3D parallax effect, to generate a relatively good 3D parallax effect.

To achieve the foregoing objective, the following technical solutions are used in the embodiments of the present invention:

According to a first aspect of the embodiments of the present invention, a method for displaying with a 3D parallax effect is provided, and may be applied to VR. The method includes: displaying a graphical user interface, where the graphical user interface includes first content, and the first content includes at least two elements; obtaining a first operation instruction, where the first operation instruction is used for moving, in an area for displaying the first content, at least one first element of the at least two elements; and moving, in response to the first operation instruction, in the area for displaying the first content, each of the at least one first element by a different distance along a direction of a first straight line, so that the first content has a 3D parallax effect, where the direction of the first straight line is a direction having a preset included angle with a plane in which the graphical user interface is located.

In the embodiments of the present invention, because a VR device adds, in response to the first operation instruction, a spacing of each of the at least one first element in the direction of the first straight line, a relatively good 3D parallax effect can be generated.

In one embodiment, the at least two elements may be of at least one type in straight section, bent section, 3D section, 3D model, 2D video, 3D video, and 360° panoramic video. When at least two elements are of at least two types in straight section, bent section, 3D section, 3D model, 2D video, 3D video, and 360° panoramic video, because the at least two elements include a 3D element, the first content may have a stronger longitudinal-depth feeling and stereoscopic feeling, improving user experience.

In one embodiment, the first content may further include a masking layer, some of the at least two elements are located on one side of the masking layer, and the other elements are located on the other side of the masking layer. Through separation of the masking layer, the VR device may distribute some of the at least two elements on one side of the masking layer, and distribute the other elements on the other side of the masking layer, thereby increasing space dimensions between the at least two elements, and enhancing a 3D parallax effect of the first content.

In one embodiment, after the "moving each of the at least one first element by a different distance along a direction of a first straight line", the method in the embodiments of the present invention may further include: obtaining a second operation instruction, where the second operation instruction is used for rotating, in the area for displaying the first content, each of the at least two elements; and rotating, in response to the second operation instruction, in the area for displaying the first content, each of the at least two elements around a first direction by using a preset point as a central point, so that the first content has a first effect, where the first effect is an attracting effect or a repelling effect, and the first direction is a direction parallel to the plane in which the graphical user interface is located. The VR device may rotate, in the area, each of the at least two elements in response to the second operation instruction, so that the first content has the attracting effect or the repelling effect.

In one embodiment, the at least two elements are elements in a plurality of elements, and the plurality of elements are elements included in the first content. Before the "displaying a graphical user interface", the method in the embodiments of the present invention may further include: obtaining information about the first content; and determining, in the plurality of elements, the at least two elements based on the information about the first content, a status of a network, and hardware performance of a VR device, where the network is a network connected to the VR device. Because the status of the network and the hardware performance of the VR device are considered for the at least two elements determined by the VR device, when the first content including the at least two elements is displayed, a case in which a frame loss and frame freezing occur in a picture when the status of the network and the hardware performance of the VR device are relatively poor can be avoided, improving performance of the VR device.

In one embodiment, after the "moving each of the at least one first element by a different distance along a direction of a first straight line", the method in the embodiments of the present invention may further include: obtaining a third operation instruction, where the third operation instruction is used for performing, in the area for displaying the first content, transformation processing on at least one second element of the at least two elements; and performing transformation processing on the at least one second element in a preset manner in response to the third operation instruction, so that the first content has a dynamic change effect. After the VR device performs transformation processing on the at least one second element in the preset manner, the first content displayed on the graphical user interface is more complete, so that a user has a better experience.

In one embodiment, after the "moving each of the at least one first element by a different distance along a direction of a first straight line", the method in the embodiments of the present invention may further include: analyzing each of the at least two elements, to determine at least one third element; and for each of the at least one third element, the following method is performed: splitting one third element into at least two sub-elements by using a preset algorithm; and displaying each of the at least two sub-elements at a predetermined location in the area for displaying the first content. The VR device displays split at least one third element at the predetermined location in the area for displaying the first content, so that the first content has a new 3D parallax effect.

In one embodiment, the method in the embodiments of the present invention may further include: detecting an environment parameter of an environment in which the VR device is located; obtaining, when the environment parameter satisfies a preset condition, a target element corresponding to the environment parameter; and displaying the target element on the graphical user interface in an overlapping manner. Because the VR device may display, on the graphical user interface, the environment parameter of the environment in which the VR device is located, the user may obtain, by using the VR device, an environment parameter of an environment in which the user is currently located, further improving user experience.

In one embodiment, after the "displaying the target element on the graphical user interface in an overlapping manner", the method in the embodiments of the present invention may further include: removing, when the environment parameter does not satisfy the preset condition, the target element displayed on the graphical user interface. Because the VR device may display, on the graphical user interface, the environment parameter of the environment in which the VR device is located, the user may obtain, by using the VR device, an environment parameter of an environment in which the user is currently located, further improving user experience.

According to a second aspect of the embodiments of the present invention, an apparatus for displaying with a 3D parallax effect is provided, and is applied to VR. The apparatus for displaying with a 3D parallax effect may include: a display unit, an obtaining unit, and a processing unit. The display unit is configured to display a graphical user interface, where the graphical user interface includes first content, and the first content includes at least two elements. The obtaining unit is configured to obtain a first operation instruction, where the first operation instruction is used for moving, in an area for displaying the first content, at least one first element of the at least two elements. The processing unit is configured to move, in response to the first operation instruction, in the area for displaying the first content, each of the at least one first element by a different distance along a direction of a first straight line, so that the first content has a 3D parallax effect, where the direction of the first straight line is a direction having a preset included angle with a plane in which the graphical user interface is located.

In one embodiment, the at least two elements may be of at least one type in straight section, bent section, 3D section, 3D model, 2D video, 3D video, and 360° panoramic video.

In one embodiment, the first content may further include a masking layer, some of the at least two elements are located on one side of the masking layer, and the other elements are located on the other side of the masking layer.

In one embodiment, the obtaining unit is further configured to: after the processing unit moves each of the at least one first element by the different distance along the direction of the first straight line, obtain a second operation instruction, where the second operation instruction is used for rotating, in the area for displaying the first content, each of the at least two elements. The processing unit is further configured to rotate, in response to the second operation instruction, in the area for displaying the first content, each of the at least two elements around a first direction by using a preset point as a central point, so that the first content has a first effect, where the first effect is an attracting effect or a repelling effect, and the first direction is a direction parallel to the plane in which the graphical user interface is located.

In one embodiment, the at least two elements are elements in a plurality of elements, and the plurality of elements are elements included in the first content. The obtaining unit is further configured to: before the display unit displays the graphical user interface, obtain information about the first content. The apparatus for displaying with a 3D parallax effect in the embodiments of the present invention may further include a determining unit. The determining unit is configured to determine, in the plurality of elements, the at least two elements based on the information about the first content, a status of a network, and hardware performance of a VR device, where the network is a network connected to the VR device.

In one embodiment, the obtaining unit is further configured to: after the processing unit moves each of the at least one first element by the different distance along the direction of the first straight line, obtain a third operation instruction, where the third operation instruction is used for performing, in the area for displaying the first content, transformation processing on at least one second element of the at least two elements. The processing unit is further configured to perform transformation processing on the at least one second element in a preset manner in response to the third operation instruction, so that the first content has a dynamic change effect.

In one embodiment, the processing unit is further configured to: after moving each of the at least one first element by the different distance along the direction of the first straight line, analyze each of the at least two elements, to determine at least one third element. For each of the at least one third element, the processing unit is further configured to: split one third element into at least two sub-elements by using a preset algorithm; and display each of the at least two sub-elements at a predetermined location in the area for displaying the first content.

In one embodiment, the apparatus for displaying with a 3D parallax effect in the embodiments of the present invention may further include a detection unit. The detection unit is configured to detect an environment parameter of an environment in which the VR device is located. The obtaining unit is further configured to obtain, when the environment parameter satisfies a preset condition, a target element corresponding to the environment parameter. The display unit is further configured to display the target element, obtained by the obtaining unit, on the graphical user interface in an overlapping manner.

In one embodiment, the processing unit is further configured to: after the display unit displays the target element on the graphical user interface in an overlapping manner, remove, when the environment parameter does not satisfy the preset condition, the target element displayed on the graphical user interface.

In one embodiment, the apparatus for displaying with a 3D parallax effect has at least one of the following functions: generating, in the VR, a virtual image of a user, moving, in the VR, the virtual image of the user, responding to an operation performed in the VR by the user on the at least two elements, generating an image obtained by displaying the virtual image of the user and several elements in the VR in the overlapping manner, and sharing the image.

It should be noted that, the functional units in the second aspect of the embodiments of the present invention and the various possible embodiments of the second aspect are logical division performed on the apparatus for displaying with a 3D parallax effect, for performing the method for displaying with a 3D parallax effect in the first aspect and the various possible embodiments of the first aspect. For detailed descriptions and beneficial effect analyses of the functional units in the second aspect and the various possible embodiments of the second aspect, refer to corresponding descriptions and technical effects in the first aspect and the various possible embodiments of the first aspect. Details are not described herein again.

According to a third aspect of the embodiments of the present invention, an apparatus for displaying with a 3D parallax effect is provided. The apparatus for displaying with a 3D parallax effect may include: a processor, a memory, and a display. The memory is configured to store a computer executable instruction, the processor, the display, and the memory are connected by using a bus, and when the apparatus for displaying with a 3D parallax effect runs, the processor executes the computer executable instruction stored in the memory, to enable the apparatus for displaying with a 3D parallax effect to perform the method for displaying with a 3D parallax effect according to the first aspect and the various optional manners of the first aspect.

For detailed descriptions and corresponding technical effect analyses of the modules of the apparatus for displaying with a 3D parallax effect in the third aspect, refer to the detailed descriptions in the first aspect and the various possible embodiments of the first aspect. Details are not described herein again in the embodiments of the present invention.

According to a fourth aspect of the embodiments of the present invention, a computer readable storage medium is provided. The computer readable storage medium includes a computer instruction, and when the computer instruction is executed on a computer, the computer is enabled to perform the method for displaying with a 3D parallax effect according to the first aspect and the various optional manners of the first aspect.

According to a fifth aspect of the embodiments of the present invention, a computer program product is provided. When the computer program product is run on a computer, the computer is enabled to perform the method for displaying with a 3D parallax effect according to the first aspect and the various optional manners of the first aspect.

DESCRIPTION OF EMBODIMENTS

In the specification and claims in embodiments of the present invention, the terms "first", "second", and so on are intended to distinguish between different objects but do not indicate a particular order of the objects. For example, a first operation instruction, a second operation instruction, and the like are used for distinguishing between different operation instructions, but not used for describing a particular sequence of the operation instructions.

In the description of the embodiments of the present invention, unless otherwise stated, "a plurality of" means two or more than two. For example, a plurality of processors means that two or more processors are included.

In the embodiments of the present invention, the word "exemplary", "for example", or the like is used to represent giving an example, an illustration, or a description. Any embodiment or design scheme described as an "exemplary" or "for example" in the embodiments of the present invention should not be explained as being more preferred or having more advantages than another embodiment or design scheme. Exactly, use of the word "exemplary" or "example" or the like is intended to present a relative concept in a specific manner.

The following explains and describes some concepts in a method and an apparatus for displaying with a 3D parallax effect according to the embodiments of the present invention.

Masking layer: A masking layer is used for establishing a display area, and defining a boundary of a graphical user interface.

360° panoramic video: A 360° panoramic video may include a 2D panoramic video and a 3D panoramic video. A panoramic video is a video that is shot in a normal effective angle of view (about 90° horizontally and 70° vertically) of human eyes, or above an eye-corner angle of view (about 180° horizontally and 90° vertically) of eyes, or in a 360° complete scenario range. A user freely views a shot video in 360 degrees from all directions, and may view the shot video from top and bottom, from left and right, or from front and back, or even from long and short distances.

To resolve a problem in the background that, because a plurality of elements used are all 2D elements, a 3D effect generated is relatively poor when the plurality of 2D elements are placed at preset locations in space, the embodiments of the present invention provide a method and an apparatus for displaying with a 3D parallax effect.

Figure 1:
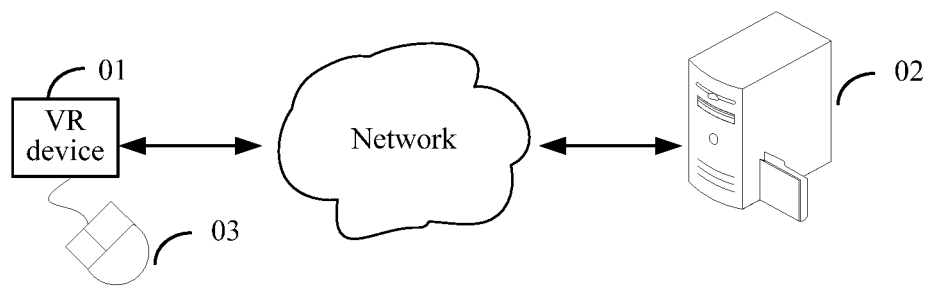
FIG. 1 is a schematic architectural diagram of a VR system according to an embodiment of the present invention.

The method for displaying with a 3D parallax effect provided in the embodiments of the present invention may be applied to a VR system. FIG. 1 is a schematic architectural diagram of a VR system according to an embodiment of the present invention. As shown in FIG. 1, the VR system may include: a VR device 01, a server 02, and a control device 03. The VR device 01 may exchange information with the server 02 through a network, and the VR device 01 may be connected to the control device 03 in a wired/wireless manner.

The VR device 01 includes an inertial measurement module, and can position three-dimensional status information of a head of a user in real time. The VR device 01 includes a graphical user interface presented to the user.

For example, the VR device 01 may be an integrative virtual reality headset, a virtual reality headset connected to a mobile phone, a virtual reality headset connected to a desktop computer, a mobile headset, or an optical waveguide mixed reality headset.

In one embodiment, the VR device in this embodiment of the present invention may have at least one of the following functions: generating, in the VR, a virtual image of a user, moving, in VR, the virtual image of the user, responding to an operation performed in the VR by the user on the at least two elements, generating an image obtained by displaying the virtual image of the user and several elements in the VR in the overlapping manner, and sharing the image.

The control device 03 is a device for the user to control the VR device 01 or for the user to operate the VR device 01. For example, the control device 03 may be a mouse, a joystick, or a remote control device.

It should be noted that, the apparatus for displaying with a 3D parallax effect provided in this embodiment of the present invention may be the VR device 01 in FIG. 1, or may be a functional module or a functional entity, in the VR device 01, that can perform the method for displaying with a 3D parallax effect provided in the embodiments of the present invention. The VR device 01 in this embodiment of the present invention is only an example of the apparatus for displaying with a 3D parallax effect. For example, the apparatus for displaying with a 3D parallax effect may alternatively be a television set, a mobile phone, a tablet computer, or an intelligent wearable device that has a VR function. This is not limited in this embodiment of the present invention.

Figure 2:
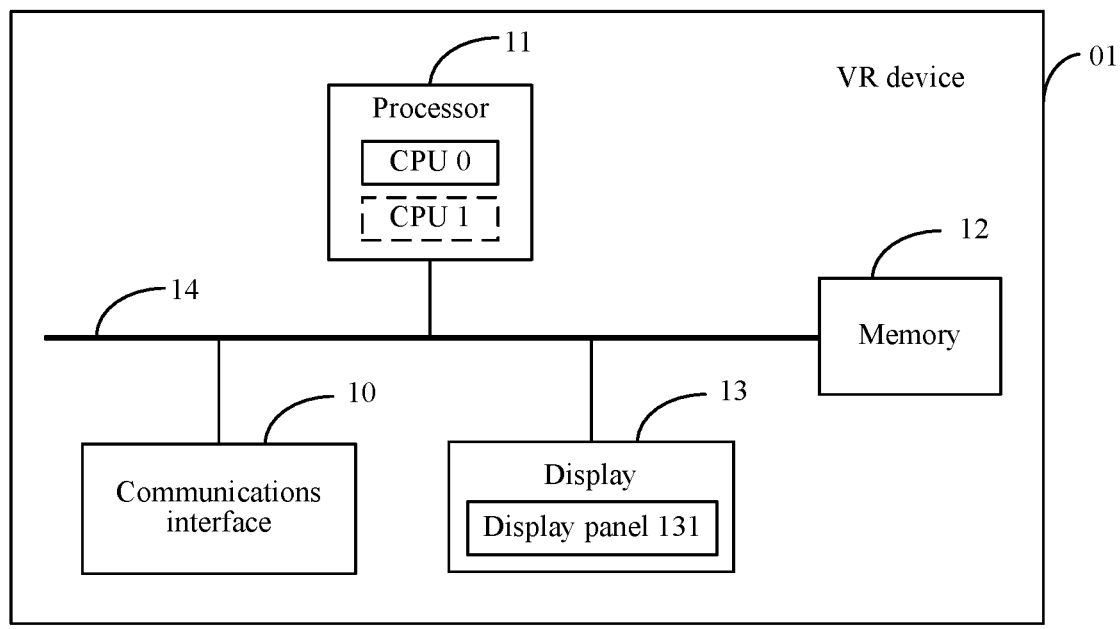
FIG. 2 is a schematic hardware diagram of a VR device according to an embodiment of the present invention.

In this embodiment of the present invention, descriptions are provided by using merely an example in which the apparatus for displaying with a 3D parallax effect is the VR device 01. The following specifically describes constituent parts of the VR device 01 with reference to FIG. 2:

FIG. 2 is a schematic hardware diagram of a VR device according to an embodiment of the present invention. As shown in FIG. 2, the VR device 01 may include: a communications interface 10, a processor 11, a memory 12, a display 13, and a bus 14.

The communications interface 10 uses any transceiver-like apparatus, to communicate with another device or a communications network, such as the Ethernet, a RAN, or a wireless local area network (WLAN). The communications interface 10 may include a receiving unit to implement a receiving function and a sending unit to implement a sending function.

The processor 11 is a control center of the VR device 01, and may be a processor, or may be a collective name of a plurality of processing components. For example, the processor 11 is a central processing unit (CPU), or may be an application specific integrated circuit (ASIC), or may be configured as one or more integrated circuits implementing this embodiment of the present invention, for example, one or more microprocessors (e.g. Digital Signal Processor, (DSP)) or one or more field programmable gate arrays (FPGA). The processor 11 uses various interfaces and lines to connect parts of the entire VR device 01. By running or executing a software program and/or module stored in the memory 12 and invoking data stored in the memory 12, the processor 11 performs various functions of the VR device 01 and processes data, thereby performing overall monitoring on the VR device 01. For example, the processor 11 may invoke the data stored in the memory 12, to perform image rendering and encapsulation processing.

In one embodiment, during specific embodiment, in an embodiment, the processor 11 may include one or more CPUs, such as a CPU 0 and a CPU 1 shown in FIG. 2.

In one embodiment, during specific embodiment, in an embodiment, the VR device 01 may include a plurality of processors. Each of these processors may be a single-core processor (Single-CPU), or may be a multi-core processor (Multi-CPU).

The memory 12 may be configured to store the software program and module. By running the software program and module stored in the memory 12, the processor 11 performs various functional applications of the VR device 01 and data processing. The memory 12 may mainly include a program storage area and a data storage area. The program storage area may store an operating system, an application program required by at least one function, and the like; and the data storage area may store data created based on use of the VR device 01, or the like. The memory 12 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM), or other compact disc storages or optical disc storages (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of instructions or data structures and capable of being accessed by a computer, but is not limited thereto.

For software implementation, a related technology in this embodiment of the present invention may be implemented by performing a functional module for implementing a method for displaying with a 3D parallax effect in this embodiment of the present invention. Software code may be stored in the memory 12 and be executed by the processor 11. As shown in FIG. 2, the memory 12 includes a graphical user interface module and an OpenGL module. The memory 12 may be implemented inside the processor 11 or outside the processor 11.

The graphical user interface module is configured to create a graphical user interface. The OpenGL module is configured to generate an application program recognizable by the processor.

For example, the graphical user interface module in this embodiment of the present invention may include a masking layer module, an animation module, a picture module, a 3D model module, and a video module. The masking layer module is configured to create a masking layer, that is, create a display area, to limit a display boundary of an image. The animation module is configured to create an animation form of a three-dimensional object, including: shifting, rotation, zooming, color, transparency, or the like. The picture module is configured to map an element to the three-dimensional object. The 3D model module is configured to create various 3D objects, including: a straight section, a bent section, a 3D section, a 3D model, and the like. The video module is configured to decode various video formats.

The display 13 may be configured to display information entered by the user, information provided for the user, and various menus of a terminal. The display 13 may include a display panel 131. In one embodiment, the display panel 131 may be configured in a form of a liquid crystal display (Liquid Crystal Display, LCD), an organic light-emitting diode (Organic Light-Emitting Diode, OLED), or the like.

The bus 14 may be a peripheral component interconnect (English: Peripheral Component Interconnect, PCI for short) bus, an extended industry standard architecture (English: Extended Industry Standard Architecture, EISA for short) bus, and or the like. The bus 14 may be classified into an address bus, a data bus, a control bus, and the like. For ease of representation, only one thick line is used to represent the bus in FIG. 2, but this does not mean that there is only one bus or only one type of bus.

It should be noted that, a structure of the VR device shown in FIG. 2 does not constitute a limitation to the VR device. During actual implementation, the VR device may include more or fewer parts than those shown in FIG. 2, or combine some parts shown in FIG. 2, or have part deployment different from that shown in FIG. 2. This is not limited in this embodiment of the present invention.

In one embodiment, the VR device may further include a camera, a battery, a Bluetooth module, a global positioning system (global positioning system, GPS) module, and the like, although not shown in FIG. 2. Details are not described herein again.

Figure 3:
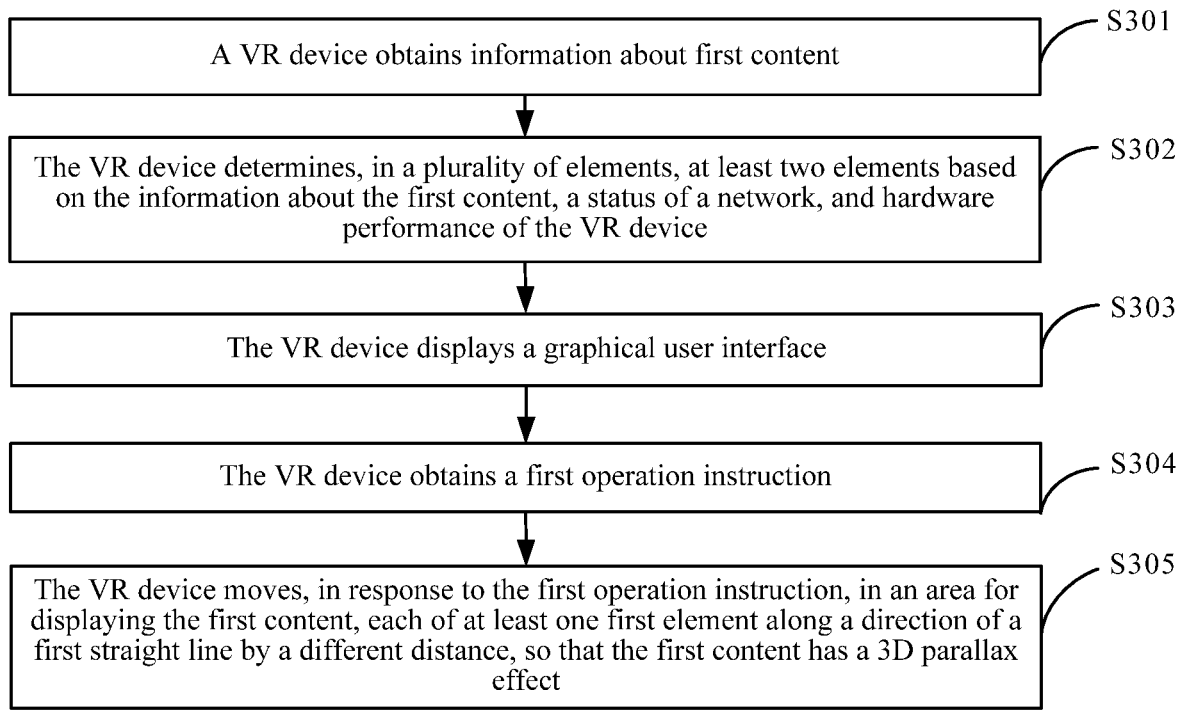
FIG. 3 is a first flowchart of a method for displaying with a 3D parallax effect according to an embodiment of the present invention.

Based on the devices in the system architecture shown in FIG. 1 and the modules or the components of the VR device shown in FIG. 2, an embodiment of the present invention provides a method for displaying with a 3D parallax effect. In the method, a process of displaying content having the 3D parallax effect is described in detail. Specifically, as shown in FIG. 3, the method for displaying with a 3D parallax effect may include the following S301 to S305.

S301: The VR device obtains information about first content.

At least two elements are elements in a plurality of elements, and the plurality of elements are elements included in the first content.

For example, in this embodiment of the present invention, the information about the first content is information about each of the plurality of elements included in the first content.

In this embodiment of the present invention, the VR device may send a request for a graphical user interface to a server, to obtain the information about the first content. Specifically, the VR device sends the request for the graphical user interface to the server. The server receives the request for the graphical user interface, and sends information about the graphical user interface to the VR device based on the request for the graphical user interface. The information about the graphical user interface includes the information about the first content. The VR device receives the information about the graphical user interface, to obtain the information about the first content. For example, the request for the graphical user interface includes keywords, such as a name, a color, and a type.

In this embodiment of the present invention, after obtaining the information about the graphical user interface, the VR device converts the information about the graphical user interface into the graphical user interface. The graphical user interface may further include another piece of content, icon, menu, button, text, and the like, in addition to the first content.

S302: The VR device determines, in a plurality of elements, at least two elements based on the information about the first content, a status of a network, and hardware performance of the VR device.

The network is a network connected to the VR device.

For example, in this embodiment of the present invention, the status of the network may include bandwidth of the network, stability of the network, and/or the like. The hardware performance of the VR device may include a processing speed of the processor, a storage capacity of the memory, and/or the like.

For example, it is assumed that the plurality of elements are n ($n \geq 3$) elements. When the status of the network and the hardware performance of the VR device are good, the VR device may use all of the n elements as the at least two elements. When the status of the network and the hardware performance of the VR device are common, the VR device may select, from then elements, m ($m<n$) elements as the at least two elements; and some of the selected m elements are planar sections, and the other elements (the other elements are fewer than some elements) are bent sections, 3D sections, 3D models, 2D videos, 3D videos, or 360° panoramic videos. When the status of the network and the hardware performance of the VR device are relatively poor, the VR device may select, from the n elements, as the at least two elements, p ($2 \leq p < m$) elements that are all straight sections.

It should be noted that, in this embodiment of the present invention, that "the status of the network is good" means that the status of the network is greater than a preset first threshold; that "the status of the network is common" means that the status of the network is greater than a preset second threshold and less than the preset first threshold; and that "the status of the network is relatively poor" means that the status of the network is less than the preset second threshold. In this embodiment of the present invention, that "the hardware performance of the VR device is good" means that the hardware performance of the VR device is greater than a preset third threshold; that "the hardware performance of the VR device is common" means that the hardware performance of the VR device is greater than a preset fourth threshold and less than the preset third threshold; and that "the hardware performance of the VR device is relatively poor" means that the hardware performance of the VR device is less than the preset fourth threshold.

S303: The VR device displays the graphical user interface.

The graphical user interface includes the first content, and the first content includes the at least two elements.

In this embodiment of the present invention, the VR device may generate the graphical user interface based on the received information about the graphical user interface.

For example, it is assumed that the request that is for the graphical user interface and that is sent by the VR device to the server is a request for the first content (such as a request for " movie"), the request for the first content includes keywords "red", "lantern", and "raise", the first content is " movie", and the at least two elements are a person dressed in chi-pao and a lantern. A client of the VR device sends the request that is for " movie" and that includes the keywords "red", "lantern", and "raise" to the server. After receiving the request for " movie", the server sends information about " movie" to the VR device. The VR device converts the information about " movie" into the first content, and the VR device displays the first content. The first content includes the person dressed in chi-pao and the lantern.

For example, in this embodiment of the present invention, the at least two elements included in the first content are obtained from a preset library of resources of the server by the server based on the received request for the graphical user interface.

For example, after receiving a request that includes keywords (such as "red", "lantern", and "raise"), the server selects, from the preset library of resources of the server, at least two elements (such as the person dressed in chi-pao and the lantern) corresponding to the request. Alternatively, after the server receives the request, if the server does not find the at least two elements in the preset library of resources, the server may select, from the preset library of resources, at least two elements (such as texts that are near-synonyms of the keywords) most similar to the keywords in the request, and then the server determines, as the at least two elements in this embodiment of the present invention, at least two elements whose keyword attributes are most similar in the request.

In one embodiment, in this embodiment of the present invention, the at least two elements may be of at least one type in straight section, bent section, 3D section, 3D model, 2D video, 3D video, and 360° panoramic video.

Figure 4:
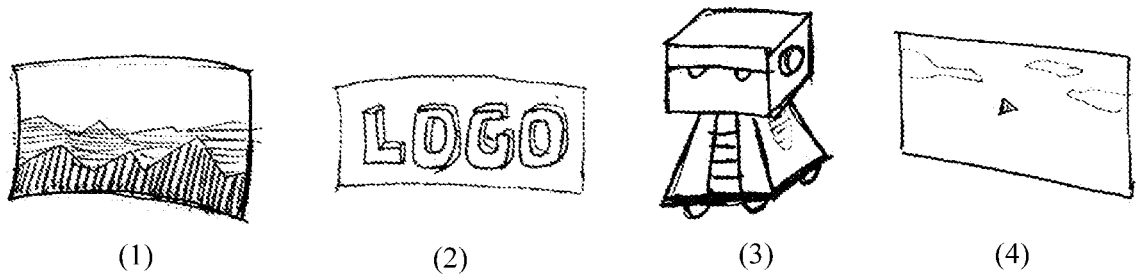
FIG. 4 is a schematic diagram of an instance of at least two elements according to an embodiment of the present invention.

For example, as shown in FIG. 4, (1) in FIG. 4 is a schematic diagram of an instance of a bent section; (2) in FIG. 4 is a schematic diagram of an instance of a 3D section; (3) in FIG. 4 is a schematic diagram of an instance of a 3D model; and (4) in FIG. 4 is a schematic diagram of an instance of a 2D video, a 3D video, or a 360° panoramic video.

S304: The VR device obtains a first operation instruction.

The first operation instruction is used for moving, in an area for displaying the first content, at least one first element of the at least two elements.

For example, a user may operate a control device (such as a joystick), to enable a virtual cursor displayed on the graphical user interface to point to the first content, that is, enable the virtual cursor to be located in an area for displaying the first content; and then the control device may send the first operation instruction to the VR device based on the foregoing operation of the user.

For example, the graphical user interface includes a poster 1, after the user uses the control device to move the virtual cursor to an area for displaying the poster 1, the control device may send a first operation instruction to the VR device based on the foregoing operation of the user. The first operation instruction is used for moving, in the area for displaying the poster 1, at least one first element of at least two elements of the poster 1. The at least one first element is any one or more elements of the at least two elements.

S305: The VR device moves, in response to the first operation instruction, in the area for displaying the first content, each of the at least one first element along a direction of a first straight line by a different distance, so that the first content has a 3D parallax effect.

The direction of the first straight line is a direction having a preset included angle with a plane in which the graphical user interface is located. It may be understood that, in this embodiment of the present invention, the direction of the first straight line is a direction in which the first straight line is located.

In one embodiment, in this embodiment of the present invention, the preset included angle is any included angle from 0° to 90° (not including 0°).

For example, a spatial coordinate system is provided in this embodiment of the present invention, and the plane in which the graphical user interface is located is a plane formed by an X axis and a Y axis in the spatial coordinate system.

In one embodiment, in this embodiment of the present invention, when the preset included angle is 90°, the direction of the first straight line is a Z axis in the spatial coordinate system.

In one embodiment, for each of the at least one first element, the foregoing method for moving each of the at least one first element along the direction of the first straight line by the different distance may be specifically one of the following:

(1) Each first element is moved along a positive direction of the Z axis (or a negative direction of the Z axis) by a different distance.

For example, it is assumed that, the at least two elements are three elements: a bent section, a 3D section, and a 3D model. The VR device moves, in response to the first operation instruction, in the area for displaying the first content, the bent section, the 3D section, and the 3D model along the positive direction of the Z axis (or the negative direction of the Z axis) by a different distance.

(2) One part of each first element is moved along the positive direction of the Z axis, and the other part of the each first element is moved along the negative direction of the Z axis.

For example, the VR device moves, in response to the first operation instruction, in the area for displaying the first content, any element (such as the 3D section) of the three elements along the positive direction of the Z axis, and moves the other two elements (such as the bent section and the 3D model) along the negative direction of the Z axis.

(3) One part of the first element of each first element is kept from unmoving, and the other part of the first element of each first element is moved along the positive direction of the Z axis (or the negative direction of the Z axis).

For example, the VR device keeps, in response to the first operation instruction, in the area for displaying the first content, a location of any element (such as the 3D section) of the three elements unchanged, and moves the other two elements (such as the bent section and the 3D model) along the positive direction of the Z axis (or the negative direction of the Z axis) by a different distance.

Figure 5:
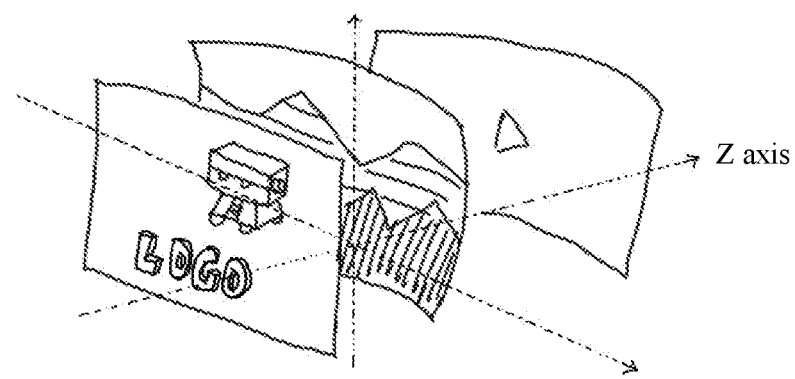
FIG. 5 is a first schematic diagram of an instance of location distribution of at least two elements on a Z axis according to an embodiment of the present invention.

For example, it is assumed that the at least two elements include a 3D section, a bent section, a 3D model, and a 360° panoramic video. FIG. 5 is a schematic diagram of an instance of location distribution of at least two elements on a Z axis according to an embodiment of the present invention. The VR device moves, in response to the first operation instruction, the 3D section along the negative direction of the Z axis by a distance, and moves the bent section along the positive direction of the Z axis by another distance, to obtain first content, shown in FIG. 5, having a 3D parallax effect.

It should be noted that, in this embodiment of the present invention, the different distance may refer to a different value, or may refer to a different direction. For example, that each first element is moved along the Z axis by the different distance may mean that each first element is moved by a different value, and moved in a same direction or in a different direction; or may mean that each first element is moved by a same value, and moved in a different direction.

A method for displaying with a 3D parallax effect is provided in this embodiment of the present invention. Because the VR device adds, in response to the first operation instruction, a spacing of each of the at least one first element in the direction of the first straight line, a relatively good 3D parallax effect can be generated.

Further, because the status of the network and the hardware performance of the VR device are considered for the at least two elements determined by the VR device, when the first content including the at least two elements is displayed, a case in which a frame loss and frame freezing occur in a picture when the status of the network and the hardware performance of the VR device are relatively poor can be avoided, improving performance of the VR device.

Further, in this embodiment of the present invention, when at least two elements are of at least two types in straight section, bent section, 3D section, 3D model, 2D video, 3D video, and 360° panoramic video, because the at least two elements include a 3D element, the first content may have a stronger longitudinal-depth feeling and stereoscopic feeling, improving user experience.

In one embodiment, in this embodiment of the present invention, the first content may further include a masking layer. Some of the at least two elements are located on one side of the masking layer, and the other elements are located on the other side of the masking layer.

Figure 6:
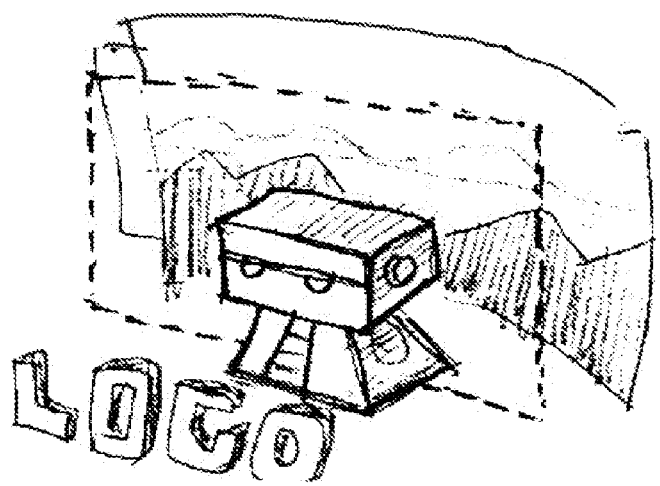
FIG. 6 is a second schematic diagram of an instance of location distribution of at least two elements on a Z axis according to an embodiment of the present invention.

For example, the at least two elements are four elements: a masking layer, a bent section, a 3D section, and a 3D model. FIG. 6 is a schematic diagram of an instance of location distribution of at least two elements on a Z axis according to an embodiment of the present invention. The 3D section and the 3D model are located on one side of the masking layer, and the bent section are located on the other side of the masking layer. A dashed-line box in FIG. 6 is used for representing the masking layer.

The VR device may separate the at least two elements by using the masking layer, to be specific, distribute some of the at least two elements on one side of the masking layer, and distribute the other elements on the other side of the masking layer, thereby increasing space dimensions between the at least two elements, and enhancing a 3D parallax effect of the first content.

Figure 7:
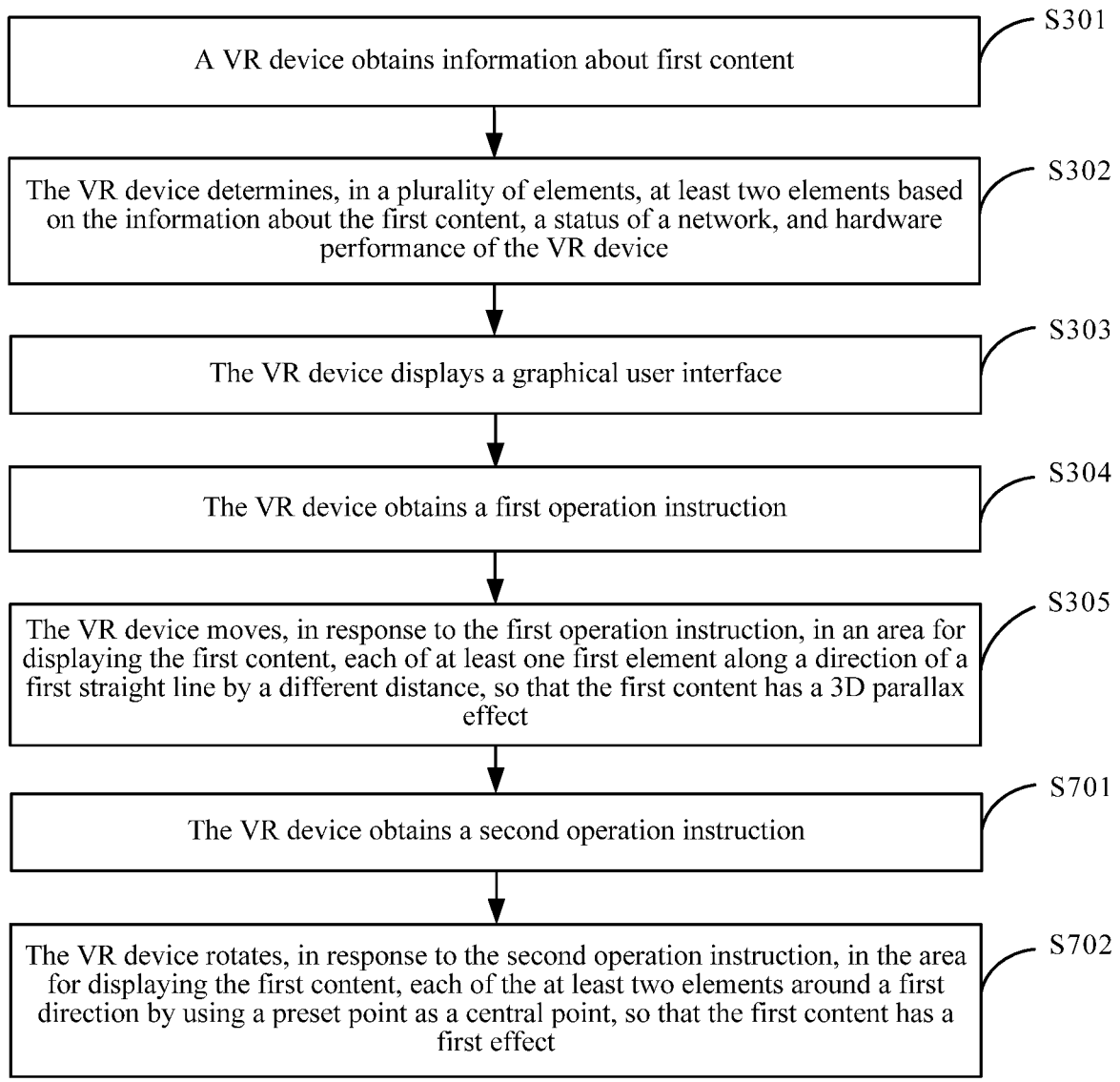
FIG. 7 is a second flowchart of a method for displaying with a 3D parallax effect according to an embodiment of the present invention.

In one embodiment, the VR device may further rotate, in the area for displaying the first content, each of the at least two elements according to the second operation instruction, so that the first content has an attracting effect or a repelling effect. Specifically, in this embodiment of the present invention, with reference to FIG. 3, as shown in FIG. 7, after S305, the method for displaying with a 3D parallax effect provided in this embodiment of the present invention may further include S701 and S702.

S701: The VR device obtains a second operation instruction.

The second operation instruction is used for rotating, in the area for displaying the first content, each of the at least two elements.

For example, a user may operate the control device, to enable the virtual cursor to move along a direction parallel to the plane in which the graphical user interface is located. In this case, the control device may send the second operation instruction to the VR device based on the operation of the user.

For example, referring to the spatial coordinate system in the foregoing embodiment, it is assumed that, in this embodiment of the present invention, the graphical user interface includes the poster 1, and the user uses the control device to move the virtual cursor along the X axis or the Y axis; and the control device sends the second operation instruction to the VR device based on the operation of the user. The second operation instruction is used for rotating, in the area for displaying the poster 1, each of the at least two elements of the poster 1.

S702: The VR device rotates, in response to the second operation instruction, in the area for displaying the first content, each of the at least two elements around a first direction by using a preset point as a central point, so that the first content has a first effect.

The first effect is an attracting effect or a repelling effect, and the first direction is the direction parallel to the plane in which the graphical user interface is located.

For example, the first direction may be the X axis or the Y axis. When the virtual cursor moves along the X axis, each of the at least two elements rotates around the Y axis; or when the virtual cursor moves along the Y axis move, each of the at least two elements rotates around the X axis.

For example, when the virtual cursor moves along a positive direction of the X axis, and each of the at least two elements rotates around the Y axis clockwise, the first content has the attracting effect; when the virtual cursor moves along a positive direction of the X axis, and each of the at least two elements rotates around the Y axis anticlockwise, the first content has the repelling effect; when the virtual cursor moves along a negative direction of the X axis, and each of the at least two elements rotates around the Y axis clockwise, the first content has the repelling effect; or when the virtual cursor moves along a negative direction of the X axis, and each of the at least two elements rotates around the Y axis anticlockwise, the first content has the attracting effect.

For example, when the virtual cursor moves along a positive direction of the Y axis, and each of the at least two elements rotates around the X axis clockwise, the first content has the repelling effect; when the virtual cursor moves along a positive direction of the Y axis, and each of the at least two elements rotates around the X axis anticlockwise, the first content has the attracting effect; when the virtual cursor moves along a negative direction of the Y axis, and each of the at least two elements rotates around the X axis clockwise, the first content has the attracting effect; or when the virtual cursor moves along a negative direction of the Y axis, and each of the at least two elements rotates around the X axis anticlockwise, the first content has the repelling effect.

For example, the attracting effect (such as a value of an attracting force) is proportional to magnitude of a coordinate value, in the positive direction of the X axis, of an end point of the virtual cursor; and the attracting effect is inversely proportional to magnitude of a coordinate value, in the negative direction of the X axis, of the end point of the virtual cursor. The repelling effect (such as a value of a repelling force) is inversely proportional to the magnitude of the coordinate value, in the positive direction of the X axis, of the end point of the virtual cursor; and the repelling effect is proportional to the magnitude of the coordinate value, in the negative direction of the X axis, of the end point of the virtual cursor.

Figure 8:
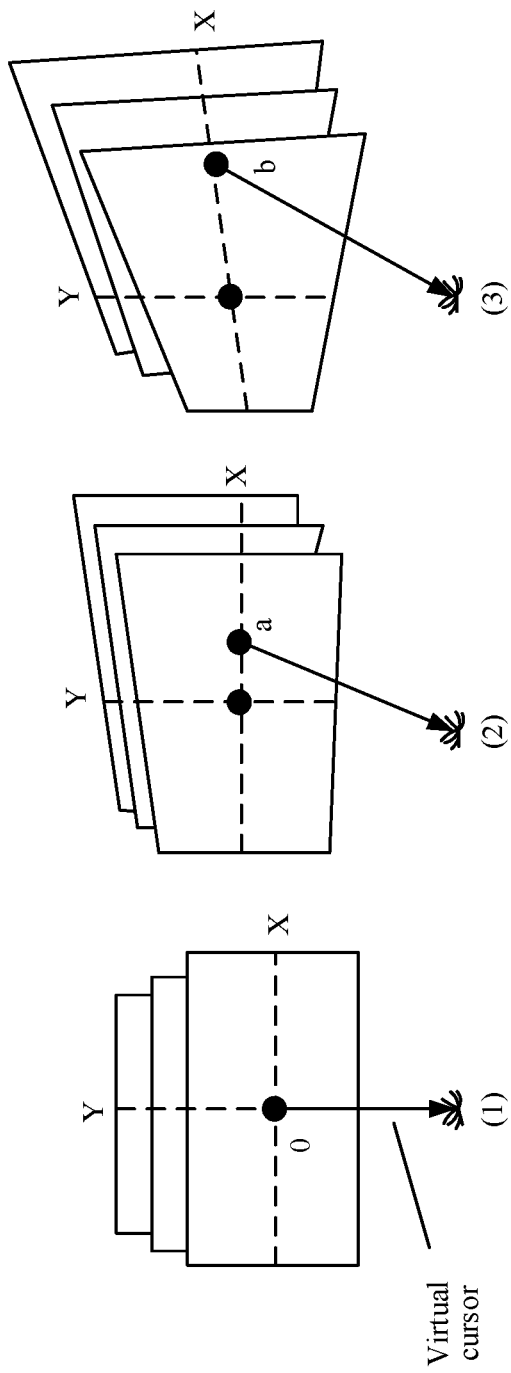
FIG. 8 is a schematic diagram of an instance in which each of at least two elements rotates around a first direction according to an embodiment of the present invention.

For example, FIG. 8 is a schematic diagram of an instance in which each of at least two elements rotates around a first direction according to an embodiment of the present invention. As shown in (1) in FIG. 8, the end point of the virtual cursor is located at a central point, to be specific, each of the at least two elements does not rotate when the virtual cursor does not move along the X axis or the Y axis. As shown in (2) in FIG. 8, the end point of the virtual cursor is located at coordinates (a, 0), a>0, and each of the at least two elements rotates around the Y axis clockwise by θ1. As shown in (3) in FIG. 8, the end point of the virtual cursor is located at coordinates (b, 0), b>a, each of the at least two elements rotates around the Y axis clockwise by θ2, and θ2>θ1. It may be understood that, the attracting effect in (3) in FIG. 8 is greater than the attracting effect in (2) in FIG. 8.

Figure 9:
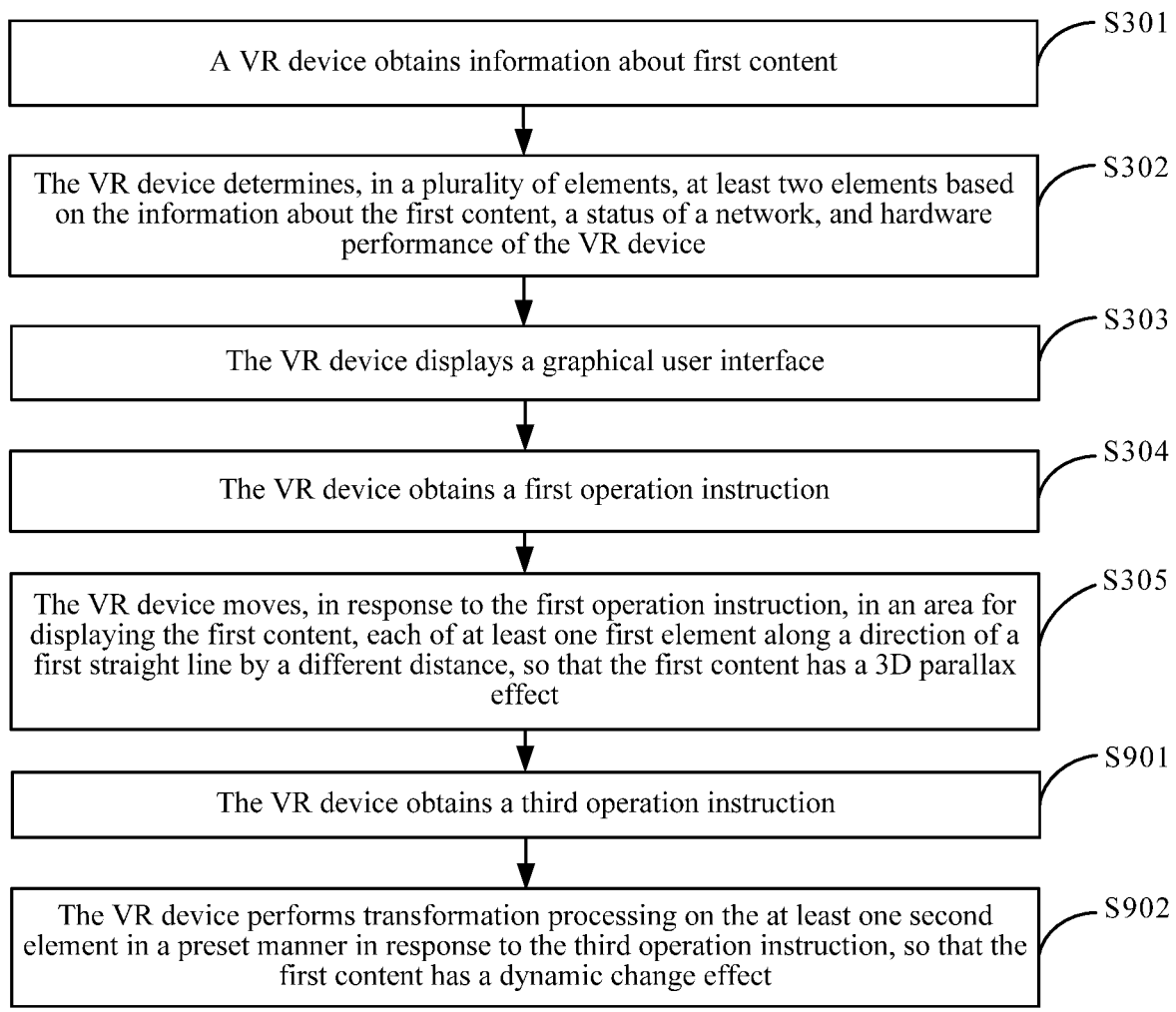
FIG. 9 is a third flowchart of a method for displaying with a 3D parallax effect according to an embodiment of the present invention.

In one embodiment, the VR device may further perform, in the area for displaying the first content, transformation processing on at least one second element of the at least two elements according to a third operation instruction, so that the first content has a dynamic change effect. Specifically, in this embodiment of the present invention, with reference to FIG. 3, as shown in FIG. 9, after S305, the method for displaying with a 3D parallax effect provided in this embodiment of the present invention may further include S901 and S902.

S901: The VR device obtains a third operation instruction.

The third operation instruction is used for performing, in the area for displaying the first content, transformation processing on at least one second element of the at least two elements.

For example, a user may operate the control device, to enable the virtual cursor to select the first content. In this case, the control device may send the third operation instruction to the VR device based on the operation of the user.

For example, in this embodiment of the present invention, the graphical user interface includes the poster 1, and the user operates the control device to enable the virtual cursor to move to the area for displaying the poster 1, and clicks the poster 1; and the control device sends the third operation instruction to the VR device based on the operation of the user. The third operation instruction is used for performing, in the area for displaying the poster 1, transformation processing on at least one second element of the at least two elements of the poster 1.

It should be noted that, in this embodiment of the present invention, the at least one second element may be completely the same as the at least one first element, or may be partially the same as the at least one first element, or may be completely different from the at least one first element. Specifically, this is determined based on an actual use requirement, and this is not limited in this embodiment of the present invention.

S902: The VR device performs transformation processing on the at least one second element in a preset manner in response to the third operation instruction, so that the first content has a dynamic change effect.

For example, the transformation processing may include deformation, zooming, moving, rotation, and the like. The dynamic change effect is a 3D effect with complete elements and content.

For example, it is assumed that, in this embodiment of the present invention, the graphical user interface includes the poster 1, and the poster 1 includes the 3D model, the bent section, the 3D section, and the 3D video. The VR device deforms, in response to the third operation instruction, the 3D model to a complete 3D model, moves the bent section to a preset location, and zooms in the 3D video and converts the 3D video into a 360° panoramic video, so that the poster 1 has the dynamic change effect.

In this embodiment of the present invention, after the VR device performs transformation processing on the at least one second element in the preset manner, the first content displayed on the graphical user interface may be more complete, so that the user has better experience.

Figure 10:
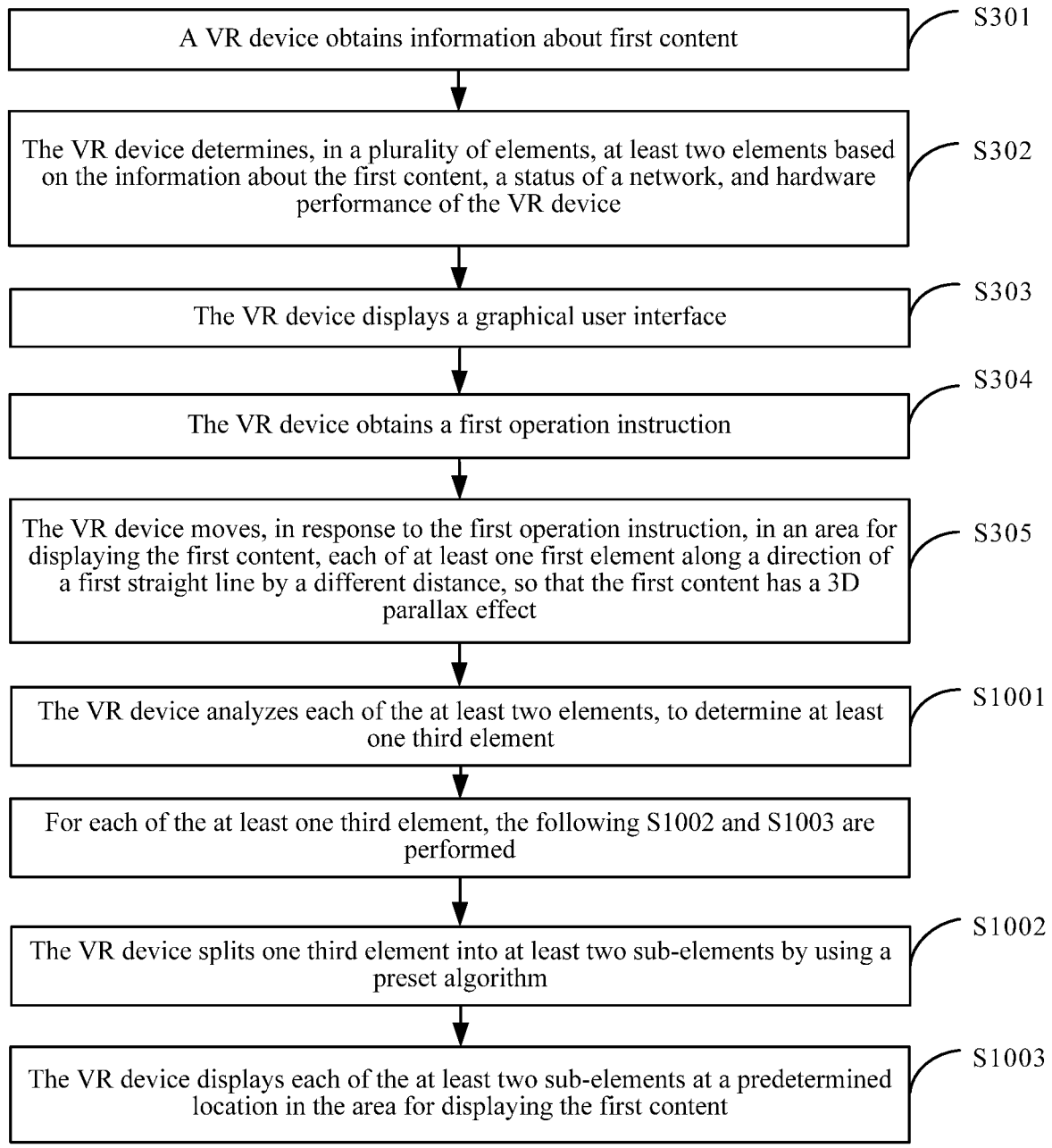
FIG. 10 is a fourth flowchart of a method for displaying with a 3D parallax effect according to an embodiment of the present invention.

In one embodiment, in this embodiment of the present invention, with reference to FIG. 3, as shown in FIG. 10, after S305, the method for displaying with a 3D parallax effect provided in this embodiment of the present invention may further include S1001 to S1003.

S1001: The VR device analyzes each of the at least two elements, to determine at least one third element.

After the VR device analyzes each of the at least two elements, a decomposition rule is generated. The VR device selects at least one third element from at least two elements according to the decomposition rule. The at least one third element is a decomposable element.

For example, it is assumed that, in this embodiment of the present invention, the graphical user interface includes the poster 1, the poster 1 includes the at least two elements, and the at least two elements are the 3D model, the bent section, and the 3D section. After the VR device analyzes the 3D model, the bent section, and the 3D section, a decomposition rule is generated, and then the VR device determines, according to the decomposition rule, that the bent section and the 3D section are decomposable. In addition, the VR device learns, through an analysis, that the bent section has a person in a foreground view, a tree in a medium view, and a mountain in a distant view, and the 3D section has a plurality of words.

It should be noted that, in this embodiment of the present invention, the at least one third element may be completely the same as the at least one first element or the at least one second element, or may be partially the same as the at least one first element or the at least one second element, or may be completely different from the at least one first element or the at least one second element. Specifically, this is determined based on an actual use requirement, and this is not limited in this embodiment of the present invention.

Further, in this embodiment of the present invention, for each of the at least one third element, the following S1002 and S1003 are performed.

S1002: The VR device splits one third element into at least two sub-elements by using a preset algorithm.

For example, a third element determined by the VR device is a bent section. The VR device may split the bent section into the person in the foreground view, the tree in the medium view, and the mountain in the distant view.

S1003: The VR device displays each of the at least two sub-elements at a predetermined location in the area for displaying the first content.

For example, the VR device displays the person in the foreground view, the tree in the medium view, and the mountain in the distant view at a predetermined location in the area for displaying the poster 1.

In this embodiment of the present invention, the VR device displays the split at least one third element at the predetermined location in the area for displaying the first content, so that the first content may have anew 3D parallax effect, namely, a 3D parallax effect different from the 3D parallax effect that the first content has after S305 is performed.

Figure 11:
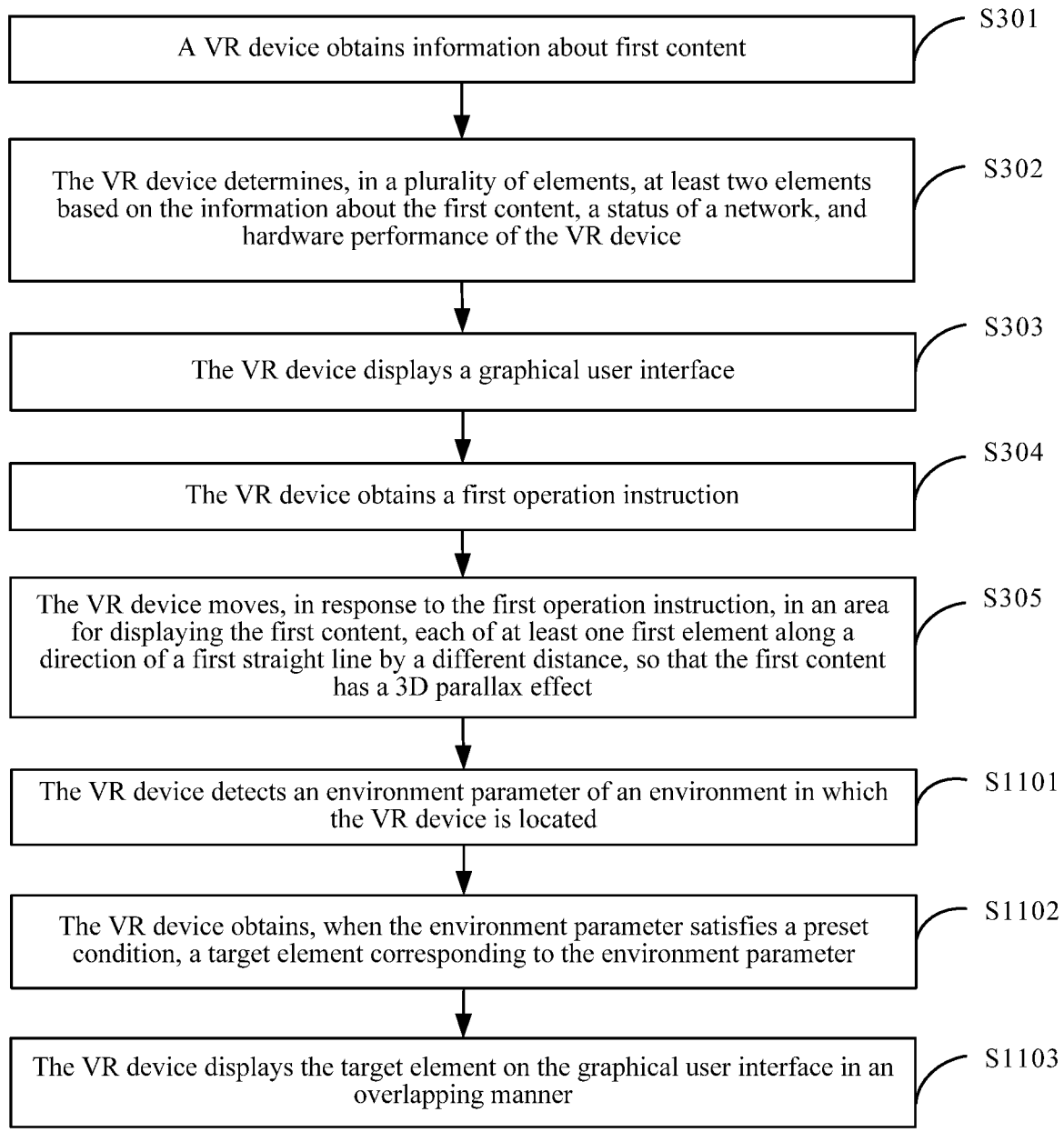
FIG. 11 is a fifth flowchart of a method for displaying with a 3D parallax effect according to an embodiment of the present invention.

In one embodiment, in this embodiment of the present invention, the VR device may determine, based on an environment in which the VR device is located, a target element displayed on the graphical user interface in an overlapping manner. With reference to FIG. 3, as shown in FIG. 11, after S305, the method for displaying with a 3D parallax effect provided in this embodiment of the present invention may further include S1101 to S1103.

S1101: The VR device detects an environment parameter of the environment in which the VR device is located.

The environment parameter may include humidity, temperature, sunlight, or the like.

S1102: The VR device obtains, when the environment parameter satisfies a preset condition, a target element corresponding to the environment parameter.

In one embodiment, in this embodiment of the present invention, the preset condition may include at least one of the following: the humidity is greater than or equal to a fifth threshold, the temperature is less than or equal to a sixth threshold, a solar index is greater than or equal to a seventh threshold, and the like.

For example, when the environment parameter detected by the VR device is the humidity, and the humidity is greater than or equal to the fifth threshold, the target element that is obtained by the VR device and that corresponds to the humidity may be a drop of water; or when the environment parameter detected by the VR device is the temperature, and the temperature is less than or equal to the sixth threshold, the target element that is obtained by the VR device and that corresponds to the temperature may be an ice bead.

S1103: The VR device displays the target element on the graphical user interface in the overlapping manner.

The VR device may display the target element and the at least two elements in the overlapping manner in the area for displaying the first content; and the VR device may further display the target element in the overlapping manner in an area other than the area for displaying the first content on the graphical user interface.

Figure 12:
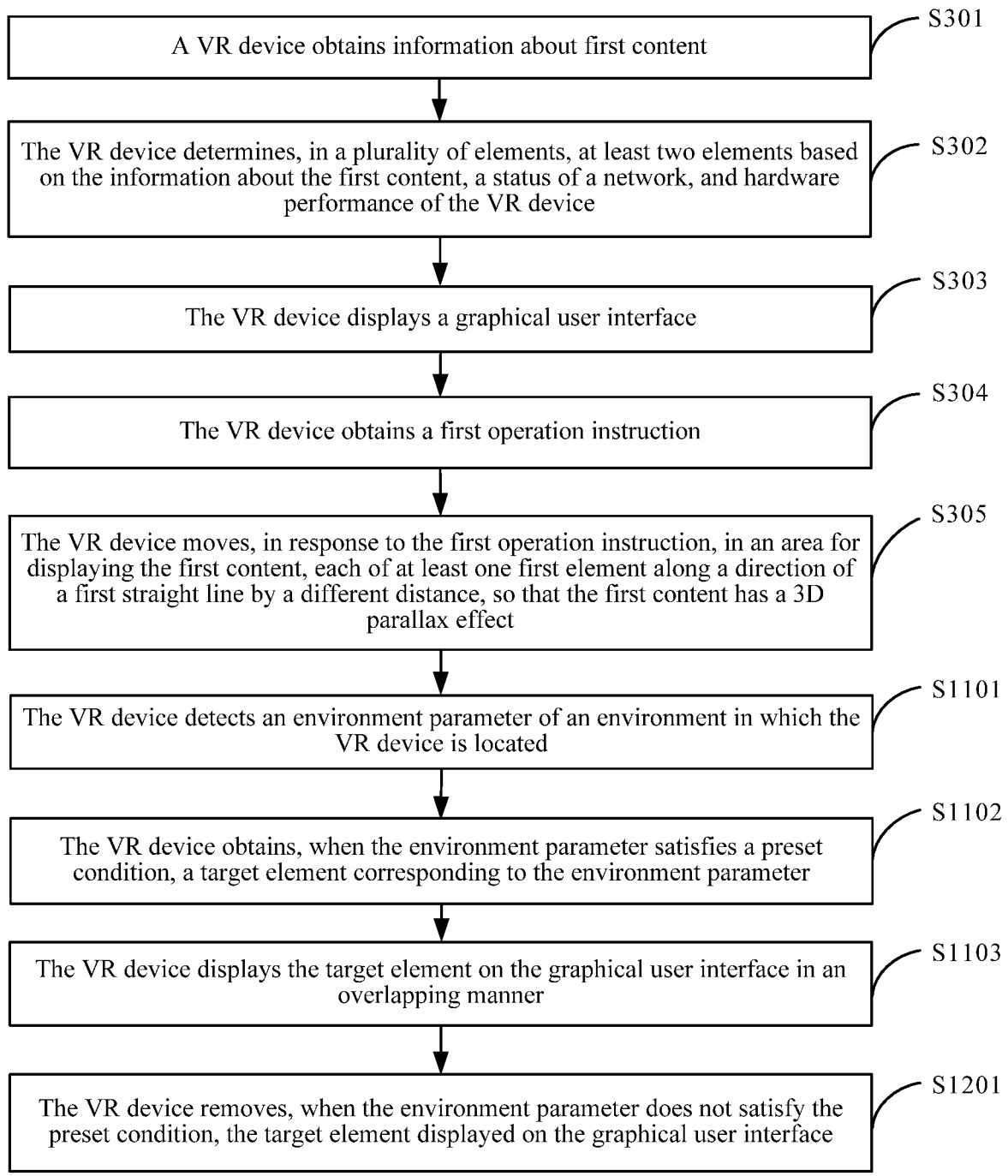
FIG. 12 is a sixth flowchart of a method for displaying with a 3D parallax effect according to an embodiment of the present invention.

Further, in this embodiment of the present invention, with reference to FIG. 11, as shown in FIG. 12, after S1103, the method for displaying with a 3D parallax effect provided in this embodiment of the present invention may further include S1201.

S1201: The VR device removes, when the environment parameter does not satisfy the preset condition, the target element displayed on the graphical user interface.

For example, after S1203, when the VR device detects that the humidity is less than the fifth threshold, the VR device may remove a drop of water displayed on the graphical user interface; or when the VR device detects that the temperature is greater than the sixth threshold, the VR device may remove an ice bead displayed on the graphical user interface.

In this embodiment of the present invention, because the VR device may display, on the graphical user interface, the environment parameter of the environment in which the VR device is located, the user may obtain, by using the VR device, an environment parameter of an environment in which the user is currently located, further improving user experience.

The foregoing mainly describes, from a perspective of a method for displaying with a 3D parallax effect, the solutions provided in the embodiments of the present invention. It may be understood that, to implement the foregoing functions, the apparatus for displaying with a 3D parallax effect includes corresponding hardware structures and/or software modules for performing the functions. A person skilled in the art should be easily aware that, the apparatus for displaying with a 3D parallax effect and algorithm steps in the examples described with reference to the embodiments disclosed in this specification may be implemented by hardware or a combination of hardware and computer software in the present invention. Whether a function is performed by hardware or hardware driven by computer software depends on particular applications and design constraints of the technical solutions. The person skilled in the art may use different methods to implement the described functions for each particular application, but it should not be considered that the embodiment goes beyond the scope of the present invention.

In the embodiments of the present invention, division of functional modules or functional units may be performed, based on the foregoing method examples, on the apparatus for displaying with a 3D parallax effect. For example, the division of the functional modules or the functional units may be performed corresponding to the functions, or two or more functions may be integrated in one processing module. The foregoing integrated module may be implemented in a form of hardware, or may be implemented in a form of a software function module or function unit. In the embodiments of the present invention, module or unit division is an example, and is merely a logical function division. In actual embodiment, another division manner may be used.

Figure 13:
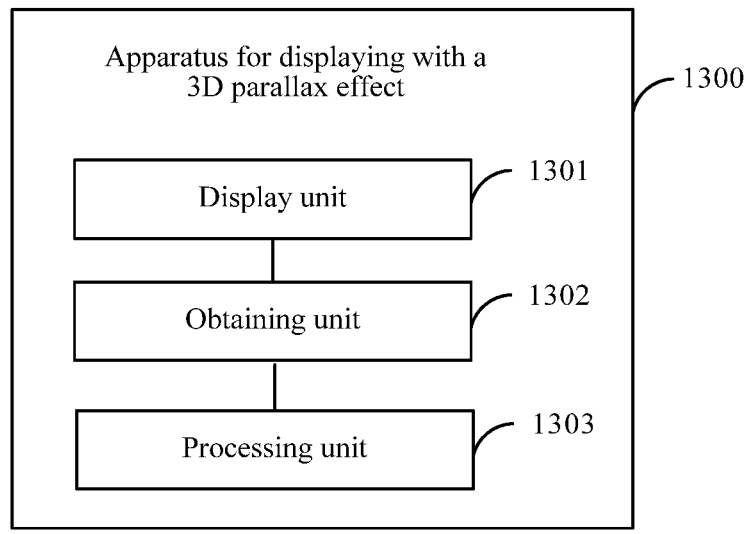
FIG. 13 is a first schematic structural diagram of an apparatus for displaying with a 3D parallax effect according to an embodiment of the present invention.

When the division of the functional modules is performed corresponding to the functions, FIG. 13 is a possible schematic structural diagram of an apparatus for displaying with a 3D parallax effect according to the foregoing embodiments. As shown in FIG. 13, the apparatus 1300 for displaying with a 3D parallax effect may include a display unit 1301, an obtaining unit 1302, and a processing unit 1303.

The display unit 1301 is configured to support S303 and S1103 in the foregoing embodiments, and/or used for another process of the technology described in the specification. The obtaining unit 1302 is configured to support S301, S304, S701, S901, and S1102 in the foregoing embodiments, and/or used for another process of the technology described in the specification. The processing unit 1303 is configured to support S305, S702, S902, S1001 to S1003, and S1201 in the foregoing embodiments, and/or used for another process of the technology described in the specification.

Figure 14:
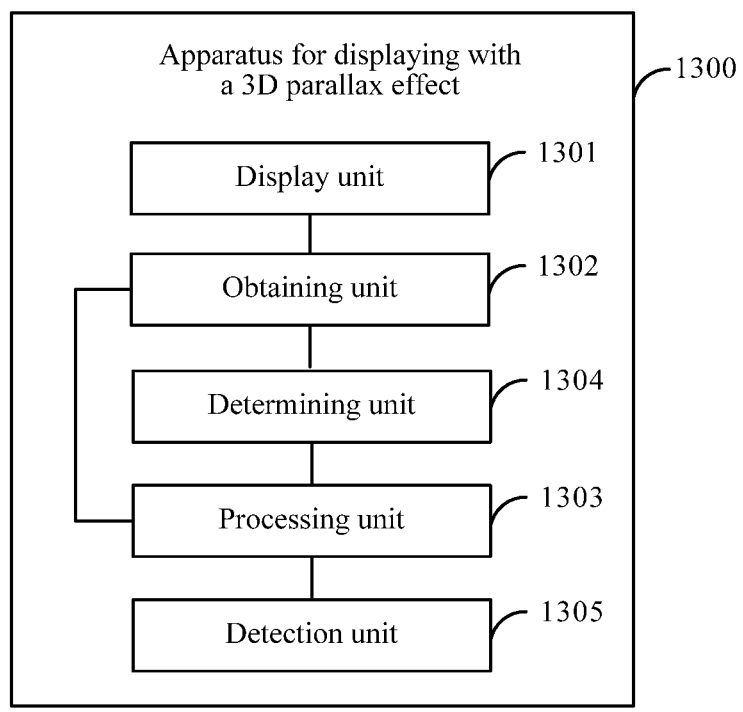
FIG. 14 is a second schematic structural diagram of an apparatus for displaying with a 3D parallax effect according to an embodiment of the present invention.

Further, as shown in FIG. 14, the apparatus 1300 that is for displaying with a 3D parallax effect and that is shown in FIG. 13 may further include: a determining unit 1304 and a detection unit 1305.

The determining unit 1304 is configured to support S302 in the foregoing embodiments, and/or used for another process of the technology described in the specification. The detection unit 1305 is configured to support S1101 in the foregoing embodiments, and/or used for another process of the technology described in the specification.

Certainly, the apparatus 1300 for displaying with a 3D parallax effect according to this embodiment of the present invention includes but is not limited to the foregoing modules. For example, the apparatus 1300 for displaying with a 3D parallax effect may further include a sending unit, a receiving unit, and a storage unit.

If an integrated unit is used, the display unit 1301, the obtaining unit 1302, the processing unit 1303, the determining unit 1304, the detection unit 1305, and the like may be implemented by being integrated in a processing module, and the processing module may be the processor 11 in the VR device 01 shown in FIG. 2. The sending unit and the receiving unit may be implemented by being integrated in a communications module, and the communications module may be the communications interface 10 in the VR device 01 shown in FIG. 2. The storage unit may be the memory 12 in the VR device 01 shown in FIG. 2.

An embodiment of the present invention further provides a computer readable storage medium. The computer readable storage medium includes computer instructions, and when the computer executes the computer instructions, the computer performs related method operations in any one of FIG. 3, FIG. 7, and FIG. 9 to FIG. 12.

For detailed descriptions of the modules in the apparatus 1300 for displaying with a 3D parallax effect according to the embodiments of the present invention, and technical effects brought after the related method operations in any one of FIG. 3, FIG. 7, and FIG. 9 to FIG. 12 are performed by the modules or the units, refer to related descriptions in the method embodiments of the present invention. Details are not described herein again.

An embodiment of the present invention further provides a computer program product. When the computer program product is run on a computer, the computer is enabled to perform related method operations in any one of FIG. 3, FIG. 7, and FIG. 9 to FIG. 12.

The apparatus 1300 for displaying with a 3D parallax effect, the computer readable storage medium, and the computer program product according to the embodiments of the present invention are all configured to perform the corresponding methods provided above. Therefore, for beneficial effects that they can achieve, refer to beneficial effects in the corresponding methods provided above. Details are not described herein again.

The foregoing descriptions about embodiments allow a person skilled in the art to clearly understand that, for the purpose of convenient and brief description, division of the foregoing function modules is used as an example for illustration. During actual application, the foregoing functions can be allocated to and implemented by different modules according to a requirement, that is, an inner structure of an apparatus is divided into different function modules to implement all or some of the functions described above.

In the several embodiments provided in the present invention, it should be understood that the disclosed apparatus and method may be implemented in other manners. For example, the described apparatus embodiment is merely an example. For example, the module or unit division is merely logical function division and may be other division in actual embodiment. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the operations of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any variation or replacement within the technical scope disclosed in the present invention shall fall within the protection scope of the present invention. Therefore, the protection scope of the present invention shall be subject to the protection scope of the claims.

What is claimed is:

1. A method for displaying with a three-dimensional (3D) parallax effect, applied to virtual reality (VR), the method comprising:
    displaying a graphical user interface, wherein the graphical user interface comprises first content, and wherein the first content comprises at least two elements;
    obtaining a first operation instruction, wherein the first operation instruction is used for moving, in an area for displaying the first content, at least one first element of the at least two elements; and
    moving, in response to the first operation instruction, in the area, each of the at least one first element by a different distance along a direction of a first straight line, so that the first content has a 3D parallax effect, wherein the direction of the first straight line is a direction having a preset included angle with a plane in which the graphical user interface is located.

2. The method according to claim 1, wherein
    the at least two elements are of at least one type in straight section, bent section, 3D section, 3D model, 2D video, 3D video, or 360° panoramic video.

3. The method according to claim 1, wherein
    the first content further comprises a masking layer, wherein some of the at least two elements are located on one side of the masking layer, and wherein the other elements are located on the other side of the masking layer.

4. The method according to claim 1, wherein after the moving each of the at least one first element by the different distance along the direction of the first straight line, the method further comprising:
obtaining a second operation instruction, wherein the second operation instruction is used for rotating, in the area, each of the at least two elements; and
rotating, in response to the second operation instruction, in the area, each of the at least two elements around a first direction by using a preset point as a central point, so that the first content has a first effect, wherein the first effect is an attracting effect or a repelling effect, and wherein the first direction is a direction parallel to the plane in which the graphical user interface is located.

5. The method according to claim 1, wherein
the at least two elements are elements in a plurality of elements, and the plurality of elements are elements comprised in the first content; and
before the displaying a graphical user interface, the method further comprising:
obtaining information about the first content; and
determining, in the plurality of elements, the at least two elements based on the information about the first content, a status of a network, and hardware performance of a VR device, wherein the network is a network connected to the VR device.

6. The method according to claim 1, wherein after the moving each of the at least one first element by the different distance along the direction of the first straight line, the method further comprising:
obtaining a third operation instruction, wherein the third operation instruction is used for performing, in the area, transformation processing on at least one second element of the at least two elements; and
performing transformation processing on the at least one second element in a preset manner in response to the third operation instruction, so that the first content has a dynamic change effect.

7. The method according to claim 1, wherein after the moving each of the at least one first element by the different distance along the direction of the first straight line, the method further comprising:
analyzing each of the at least two elements, to determine at least one third element; and
for each of the at least one third element,
splitting one third element into at least two sub-elements by using a preset algorithm; and
displaying each of the at least two sub-elements at a predetermined location in the area.

8. The method according to claim 1, the method further comprising:
detecting an environment parameter of an environment in which the VR device is located;
obtaining, when the environment parameter satisfies a preset condition, a target element corresponding to the environment parameter; and
displaying the target element on the graphical user interface in an overlapping manner.

9. The method according to claim 8, wherein after the displaying the target element on the graphical user interface in the overlapping manner, the method further comprising:
removing, when the environment parameter does not satisfy the preset condition, the target element displayed on the graphical user interface.

10. An apparatus for displaying with a three-dimensional (3D) parallax effect, wherein the apparatus comprises: a processor, a memory, and a display; and
wherein the memory is configured to store computer executable instructions, wherein the processor, the display, and the memory are connected, and wherein, when the apparatus runs, the processor executes the computer executable instructions stored in the memory, to enable the apparatus to perform operations, the operations including:
displaying, by the display, a graphical user interface, wherein the graphical user interface comprises first content, and the first content comprises at least two elements;
obtaining a first operation instruction, wherein the first operation instruction is used for moving, in an area for displaying the first content, at least one first element of the at least two elements; and
moving, in response to the first operation instruction, in the area, each of the at least one first element by a different distance along a direction of a first straight line, so that the first content has a 3D parallax effect, wherein the direction of the first straight line is a direction having a preset included angle with a plane in which the graphical user interface is located.

11. The apparatus according to claim 10, wherein the at least two elements are of at least one type in straight section, bent section, 3D section, 3D model, 2D video, 3D video, or 360° panoramic video.

12. The apparatus according to claim 10, wherein the first content further comprises a masking layer, wherein some of the at least two elements are located on one side of the masking layer, and wherein the other elements are located on the other side of the masking layer.

13. The apparatus according to claim 10, wherein the operations further include:
obtaining a second operation instruction, wherein the second operation instruction is used for rotating, in the area, each of the at least two elements; and
rotating, in response to the second operation instruction, in the area, each of the at least two elements around a first direction by using a preset point as a central point, so that the first content has a first effect, wherein the first effect is an attracting effect or a repelling effect, and wherein the first direction is a direction parallel to the plane in which the graphical user interface is located.

14. The apparatus according to claim 10, wherein the at least two elements are elements in a plurality of elements, and wherein the plurality of elements are elements comprised in the first content; and wherein the operations further include:
obtaining information about the first content before the displaying a graphical user interface; and
determining, in the plurality of elements, the at least two elements based on the information about the first content, a status of a network, and hardware performance of a VR device, wherein the network is a network connected to the VR device.

15. The apparatus according to claim 10, wherein the operations further include:
obtaining a third operation instruction, wherein the third operation instruction is used for performing, in the area, transformation processing on at least one second element of the at least two elements; and performing transformation processing on the at least one second element in a preset manner in response to the third operation instruction, so that the first content has a dynamic change effect.

16. The apparatus according to claim 10, wherein the operations further include:
analyzing each of the at least two elements, to determine at least one third element; and
for each of the at least one third element, splitting one third element into at least two sub-elements by using a preset algorithm; and displaying each of the at least two sub-elements at a predetermined location in the area.

17. The apparatus according to claim 10, wherein the operations further include:
detecting an environment parameter of an environment in which the VR device is located;
obtaining, when the environment parameter satisfies a preset condition, a target element corresponding to the environment parameter; and
displaying the target element on the graphical user interface in an overlapping manner.

18. The apparatus according to claim 17, wherein the operations further include:
removing, when the environment parameter does not satisfy the preset condition, the target element displayed on the graphical user interface.

19. A non-transitory computer readable storage medium, comprising computer instructions, wherein when the computer instructions are executed on a computer, the computer is enabled to perform operations, the operations including:
displaying a graphical user interface, wherein the graphical user interface comprises first content, and the first content comprises at least two elements;
obtaining a first operation instruction, wherein the first operation instruction is used for moving, in an area for displaying the first content, at least one first element of the at least two elements; and
moving, in response to the first operation instruction, in the area, each of the at least one first element by a different distance along a direction of a first straight line, so that the first content has a 3D parallax effect, wherein the direction of the first straight line is a direction having a preset included angle with a plane in which the graphical user interface is located.

20. The non-transitory computer readable storage medium according to claim 19, when the operations further include:
obtaining a second operation instruction, wherein the second operation instruction is used for rotating, in the area, each of the at least two elements; and
rotating, in response to the second operation instruction, in the area, each of the at least two elements around a first direction by using a preset point as a central point, so that the first content has a first effect, wherein the first effect is an attracting effect or a repelling effect, and wherein the first direction is a direction parallel to the plane in which the graphical user interface is located.

* * * * *